United States Patent
McCurdy et al.

(10) Patent No.: US 7,138,181 B2
(45) Date of Patent: Nov. 21, 2006

(54) HEAT STRENGTHENED COATED GLASS ARTICLE

(75) Inventors: Richard J. McCurdy, Aurora, IL (US); Steve E. Phillips, Ottawa, IL (US); David W. Perry, Ottawa, IL (US); Michel J. Soubeyrand, Holland, OH (US)

(73) Assignee: Pilkington North America, Inc., Toledo, OH (US)

( * ) Notice: Subject to any disclaimer, the term of this patent is extended or adjusted under 35 U.S.C. 154(b) by 429 days.

(21) Appl. No.: 10/167,160

(22) Filed: Jun. 10, 2002

(65) Prior Publication Data

US 2002/0182453 A1    Dec. 5, 2002

Related U.S. Application Data

(62) Division of application No. 09/397,360, filed on Sep. 16, 1999, now Pat. No. 6,403,147.

(60) Provisional application No. 60/100,763, filed on Sep. 17, 1998.

(51) Int. Cl.
*B32B 17/06*    (2006.01)

(52) U.S. Cl. ............... 428/432; 428/448; 428/697; 428/699; 428/701; 428/702

(58) Field of Classification Search ............ 428/432, 428/448, 697, 699, 701, 702
See application file for complete search history.

(56) References Cited

U.S. PATENT DOCUMENTS

| | | | | |
|---|---|---|---|---|
| 4,783,211 A | * | 11/1988 | Fuchigami et al. | ........... 65/104 |
| 5,248,545 A | * | 9/1993 | Proscia | ............ 427/166 |
| 6,060,178 A | * | 5/2000 | Krisko | ............ 359/359 |

* cited by examiner

*Primary Examiner*—Andrew T. Piziali
(74) *Attorney, Agent, or Firm*—Marshall & Melhorn, LLC

(57) ABSTRACT

A coated glass article which may be heat strengthened with reduced variability in sheet resistance is disclosed. A multi-layer coating is formed on a glass substrate including a barrier applied on the glass substrate, base layer of a substantially undoped metal oxide applied over the barrier layer, and an electrically conductive layer of a doped metal oxide applied directly on the base layer. The same source metal is used for the base layer and the electrically conductive layer.

8 Claims, No Drawings

HEAT STRENGTHENED COATED GLASS ARTICLE

RELATED APPLICATION

This application is a divisional application of application Ser. No. 09/397,360 filed Sep. 16, 1999, now U.S. Pat. No. 6,403,147, which claimed the benefit under 35 U.S.C. §119 (e) of a provisional application filed Sep. 17, 1998 under 35 U.S.C. §111(b), which was granted Ser. No. 60/100,763, both of which applications are hereby incorporated by reference in their entirety.

BACKGROUND OF THE INVENTION

This invention relates to a multi-layer coating formed on a glass substrate in such a fashion that the coating is electrically conductive. The glass sheet carrying the electrically conductive coating is then heat strengthened in a conventional glass heating furnace. More particularly, this invention relates to creating a multi-layer electrically conductive coating such that when heat strengthened, the variation in the sheet resistance of the coating is minimized.

Coatings can be formed from a wide variety of materials which are deposited on glass and other materials as substrates, to accomplish a variety of functions. One example of such coated glasses involves the deposition of metal oxides on such substrates, and by the addition of various so-called dopant materials, causing one or more of such metal oxide layers to be electrically conductive.

Such electrically conductive coatings on glass substrates have a wide variety of end uses, some of which require further processing of the coated glass sheets. One such additional processing step is the heat strengthening of the coated glass sheets, which involves a limited amount of controlled reheating and cooling of the coated glass sheet. Thus, heat strengthened glass is more resistant to thermal breakage due to improved surface compressive stress. Generally, glass can be said to be heat strengthened when surface compressive stress is greater than 3,500 pounds per square inch (psi).

Further, heat strengthening of the coated glass, where surface compressive stress is greater than 8,000 psi, is also known as tempering. Tempered glass, upon sufficient impact, will break in a controlled fashion, i.e. into small granular fragments, so as to reduce the likelihood of injury to people or animals who may contact it. Therefore, tempering adds a safety factor where coated glass sheets are used in applications where people may come in contact with them, for example, commercial freezers and refrigerators, such as are used in supermarkets, and/or vehicle windows and the like. Electrically conductive coated glass sheets can be advantageously used in such applications if, by the application of electrical current, the temperature of the glass sheet is raised, thereby removing frost or other moisture which can condense on the glass, thus decreasing the visibility of products which are displayed behind the glass sheets or obscuring the view of the driver of a vehicle in the case of vehicle window.

U.S. Pat. No. 4,547,400 discloses the formation of a coated soda-lime silica glass wherein a first "seal coating" is formed by the deposition of an organic/metallic ion-containing, chlorine-free compound. The stated purpose of the seal coating is to minimize penetration of said coating by chlorine containing materials which would be a potential point of reaction with sodium on the surface of the glass to form crystals of sodium chloride. The formation of sodium chloride is considered to be detrimental as it creates voids in the film leading to light scattering defects and the optically undesirable condition known as "haze". A coating of fluorine doped tin oxide is subsequently applied next to the metal oxide seal coating through the decomposition of butyltin trichloride.

U.S. Pat. No. 4,548,836 discloses subject matter similar to the '400 patent. However, it includes additional information regarding the columnar microstructure of the tin oxide coatings. This patent, however, still requires the use of a chlorine-free compound to form the "seal coating."

U.S. Pat. No. 4,788,079 discloses a method of making haze-free tin oxide coatings. The thrust of the invention of the '079 patent is the use of monophenyltin trichloride to form a haze-free tin oxide undercoat on glass, on which haze-free conductive doped tin oxide coatings may be formed under process conditions which ordinarily would give hazy coatings, if deposited directly on glass. The '079 patent is primarily directed to use of a particular organotin compound specifically monophenyltin trichloride.

U.S. Pat. No. 4,859,499 is directed to a method for coating a substrate with an electrically conductive layer. The invention of the '499 patent concerns the preparation of a metal based powder in a method for pyrolytically depositing this powder upon a substrate in order to form a transparent coating with low emissivity and greater electrical conductivity. This case, however, requires the use of dry indium formate as the precursor material to form the coating of indium oxide upon the surface of the substrate.

SUMMARY OF THE INVENTION

It is desirable to be able to control the electrical sheet conductance or its inverse, known as electrical sheet resistance, in electrically conductive coated glass sheets to accommodate the line voltage of the electrical current as applied to the coated glass sheet. For coated glass sheets which have not been heat strengthened, the conductivity or sheet resistance can be controlled with a reasonable degree of precision. It has been discovered, however, that upon heat strengthening, the sheet resistance of the electrically conductive coating changes, sometimes to a significant degree, and not in a predictable fashion. Therefore, it would be desirable to develop a glass coating which can be heat strengthened while still maintaining the sheet resistance within an acceptable range of variability.

In accordance with the present invention, a glass substrate is provided which carries a coating of substantially undoped metal oxide deposited on the glass substrate, and a coating of a doped metal oxide deposited directly on the undoped metal oxide coating, wherein the source metal of the undoped and doped metal oxides is the same.

It is an object of the present invention to provide a multi-layer metal oxide coated glass article which, upon heat strengthening, will exhibit a relatively predictable sheet resistance.

It is known that when depositing metal oxide films on glass substrates and when such films obtain a critical thickness, a mottled, reflected color, or iridescence, can occur. It would be desirable to have a heat strengthened metal oxide coated film which was color-neutral by depositing additional coating(s) to suppress such iridescence.

Most glass substrates which would be suitable for the glass sheets to be coated in the present invention are manufactured by the float glass process. While such coatings can be deposited in several ways, it would be desirable to form the coatings on-line during the float glass manufacturing process to avoid the cost associated with off-line coating operations. An additional advantage of the on-line chemical vapor deposition process is that the coatings formed, termed pyrolytic coatings, are very durable and do not require special handling, such as may be necessary for off-line sputter coated products. Accordingly, it would be desirable to form the multi-layer electrically conductive coatings with stable sheet resistance by the chemical vapor deposition process in the environment of the float bath.

DETAILED DESCRIPTION OF THE PREFERRED EMBODIMENT

In accordance with the present invention there is provided a glass substrate carrying a coating of substantially undoped metal oxide deposited on said glass substrate and a coating of a doped metal oxide deposited directly on the undoped metal oxide coating wherein the source metal of the undoped and doped metal oxides is the same. For purposes of this application "substantially undoped" means no atoms of potential dopant materials have been intentionally introduced into the metal oxide coating and conductivity will, generally be less than 2 mhos per square. Preferably, the source metal from which the oxide of substantially undoped and doped metal oxide coatings are derived is chosen from the group consisting of tin, indium, zinc, cadmium, tungsten, titanium and vanadium. Any conventional dopant which provides the desired conductivity is suitable. Where the metal is indium, a tin dopant is preferred, where the metal is tin, a fluorine dopant is preferred. The fluorine-containing compound utilized as a dopant is preferably the result of the decomposition of hydrofluoric acid but can be any suitable fluorine compound such as trifluoroacetic acid and 1,1,1 difluoroethane.

The glass substrate upon which the coatings are deposited can be of any glass composition which can be produced through the use of any conventional glass manufacturing process. It is preferred, however, that the glass substrate is a soda-lime-silica glass, of a conventional composition, and is produced using the float glass manufacturing process.

The base coating of the substantially undoped metal oxide, which is applied to said glass substrate can be, generally, chosen from the transition metals and metals closely related to the transition metals, such as indium or tin. Preferably, the source metal from which the oxide of the substantially undoped coating is derived is chosen from the group consisting of tin, indium, zinc, cadmium, tungsten, titanium and vanadium. Most preferably, the source metal for the substantially undoped metal oxide is tin.

The metal oxides are generally produced by the decomposition of organo-metallic compounds, although the deposition chemistry is not critical to the invention. Any suitable organo-metallic compound can be used, however, it is preferred that the organo-metallic compound be chosen from the group consisting of alkyl metal chlorides, metal β-diketonates and metal alkoxides. Most preferably, the organo-metallic compound is dimethyl tin dichloride (DMT).

The electrically conductive coating of a doped metal oxide is applied directly to the just described substantially undoped metal oxide coating. The selected source metal of the undoped and doped metal oxides are the same. The source metal of the metal oxide coating can be any suitable transition metal or closely related metal, preferably however, the metal is chosen from the group of tin, indium, zinc, cadmium, tungsten, titanium and vanadium. Most preferably, the source metal for the doped metal oxide layer is tin. As with the undoped metal oxide layer, the doped metal oxide layer is formed from the decomposition of an organo-metallic compound preferably chosen from the group described above, related to the undoped metal oxide layer. Most preferably, the organo-metallic compound utilized is dimethyltin dichloride (DMT).

In accordance with the combination of coatings described above, it has been discovered that the deposition of a substantially undoped metal oxide having a thickness of some 200 Å to 5,000 Å, deposited on a glass substrate, prior to a deposition of a metal oxide, having a thickness of 200 Å to 5,000 Å, directly on the undoped metal oxide coating, significantly reduces the increase in sheet resistance of the electrically conductive doped tin oxide layer which is typically observed when glass sheets carrying such coatings are heat strengthened in a manner as previously described herein. Preferably, the undoped metal oxide layer is deposited at a thickness of 300 Å to 2,500 Å and the metal oxide layer has a thickness of 300 Å to 2,500 Å, which still further reduces the previously described increase in sheet resistance.

The coated glass article produced is especially suitable for use in viewing panels for commercial freezer and/or refrigerator units, and is, particularly well suited for use with the line voltage typically used in European countries. Other potential uses include, but are not limited to: transparent electrodes for photo-copy machine platens and photovoltaic cells, electrochromic devices, flat panel displays, space heaters, appliance viewing areas, electromagnetic inductance (EMI) and radio frequency (RF) shielding.

Optionally, a barrier layer may be deposited on the glass substrate prior to deposition of the substantially undoped and doped metal oxide layers. The barrier layer acts to inhibit the migration of alkaline ions from the glass into the metal oxide coating, which is detrimental to the formation of efficient, electrically conductive coatings. Preferably, said barrier layer may be formed by the deposition of silica having a thickness of from 100 Å to 500 Å.

Another optional configuration includes the use of a color suppression or anti-iridescence interlayer between the glass substrate and the substantially undoped metal oxide coating. Any conventional one or two layer color suppression system can be used. Particularly suitable are those described in U.S. Pat. No. 4,308,316, U.S. Pat. No. 4,612,217, and U.S. Pat. No. 4,419,386, which are hereby incorporated by reference in their entirety. The use of color suppression or anti-iridescence interlayers is desirable to reduce the reflected color or iridescence of the coated glass article as the thickness of the primary undoped and doped metal oxide layers increase within the range of 200 Å to 5,000 Å.

Preferably, the color suppression interlayer is formed by the deposition of a thin, undoped tin oxide layer having a thickness from 150 Å to 350 Å and a thin, silica layer having a thickness of 150 Å to 350 Å, the thin undoped tin oxide layer being deposited directly on the glass substrate and the thin, silica layer being deposited on the thin, undoped tin oxide layer, prior to the deposition of the primary undoped metal oxide and doped metal oxide layers.

The glass substrate carrying the previously described multi-layer electrically conductive coating may be heat strengthened in a conventional glass heat treating furnace by heating the glass article to within a specified temperature range and for a specified residence time in said heating furnace. The coated glass sheet is then reduced in temperature at a controlled rate, thus creating a coated glass sheet with increased resistance to thermal breakage due to its increased surface compressive stress. Further heat strengthening of the glass, also known as tempering, maximizes the strength, as well as controlling the pattern of breakage, thus minimizing, to the greatest extent possible, the likelihood of injury upon impact.

Preferably, the coated glass sheet will be heated in a conventional type heating furnace to a temperature of between 650° C. and 750° C. with the specified residence time in said heating furnace being from 100 to 200 seconds.

The following examples, which constitute the best mode presently contemplated by the inventor for practicing the present invention, are presented solely for the purpose of further illustrating and disclosing the present invention, and are not to be construed as a limitation on the invention.

Heat strengthening of the coated glass samples was conducted utilizing standard methodologies and a conventional glass heating furnace. Standard breakage testing of the heat strengthened, in this case tempered, samples was conducted, and confirmed that suitable tempering had been achieved as they met applicable ASTM standards for tempered glass products.

The sheet resistance of the heat strengthened glass was measured on a R-Chek I using the Four-Point method.

It can clearly be seen from the resultant measurements that the smallest change in sheet resistance occurred in Trial 3, where the 800 Å undoped tin oxide base coating was deposited directly on the thin tin oxide and silica coatings comprising the color suppression coating, and beneath the highly conductive doped tin oxide coating, also 800 Å in thickness.

The mechanism by which the undoped tin oxide base coating causes the sheet resistance to be more stable after heat strengthening is not presently known. One possible explanation is that the crystallinity of the doped tin oxide layer is improved by the presence of the undoped base, or nucleation, layer. Another possibility is that the initial metal oxide layers are "poisoned" or are of intrinsically poor quality in terms of electrical conductivity due to degradation at the surface caused by mechanisms which are presently unknown.

TABLE 1

EXAMPLES

| | Coating Stack | Sheet Resistance Before Heat Strengthening (ohms/sq) | Sheet Resistance After Heat Strengthening (ohms/sq) | Change in Sheet Resistance (ohms/sq) | Standard Deviation of Heat Strengthened Coating |
|---|---|---|---|---|---|
| 1. | Glass | | | | |
| | 250Å tin oxide-undoped | 214 | 288 | 74 | 17.9 |
| | 250Å silica | | | | |
| | 300Å tin oxide-undoped | | | | |
| | 800Å tin oxide-F doped | | | | |
| 2. | Glass | | | | |
| | 300Å tin-oxide-undoped | 196 | 274 | 78 | 18.3 |
| | 800Å tin-oxide-F doped | | | | |
| 3. | Glass | | | | |
| | 250Å tin-oxide-undoped | 196 | 232 | 36 | 7.5 |
| | 250Å silica | | | | |
| | 800Å tin oxide-undoped | | | | |
| | 800Å tin oxide-F doped | | | | |

The trials producing the example of Table 1 were conducted on a full-size float glass line. Through the use of multiple coating devices in the float bath, coatings of the compounds in the thicknesses noted in Table 1 were deposited using conventional precursors.

In accordance with the provisions of the patent statutes, the present invention has been described in what is considered to represent its preferred embodiment, however, it should be noted that the invention can be practiced otherwise than as specifically illustrated and described without departing from its spirit and scope. For example, various metal oxide and dopant precursors, comprising the deposition chemistry can be used, other than those specifically disclosed herein.

We claim:

1. A coated glass article comprising:
   a) a glass substrate;
   b) a barrier layer deposited on said glass substrate;
   c) a base coating of a substantially undoped metal oxide applied to said barrier layer and having a thickness from 200 Å to 3,000 Å; and
   d) an electrically conductive coating of a doped metal oxide applied directly to said substantially undoped metal oxide coating and having a thickness of 300 Å to 2500 Å, wherein the source metal from which the oxides of the substantially undoped and doped coatings are derived is the same;
   said coated glass article being heat strengthened to have a surface compressive stress greater than 3,500 pounds per square inch.

2. The coated glass article of claim 1, said glass article having a sheet resistance of at least 232 ohms/square.

3. The coated glass article of claim 1, said coated glass article being tempered to have a surface compressive stress greater than 8,000 pounds per square inch.

4. The coated glass article of claim 1, wherein said barrier layer is silica.

5. The coated glass article of claim 1, wherein the source metal from which the oxide of the substantially undoped and doped coatings, is derived is chosen from the group consisting of tin, indium, zinc, cadmium, tungsten, titanium and vanadium.

6. The coated glass article of claim 1, wherein said barrier layer comprises a color suppression interlayer between said glass substrate and said base coating.

7. The coated glass article of claim 1, wherein said substantially undoped metal oxide is tin oxide and said doped metal oxide is fluorine doped tin oxide.

8. A coated glass article comprising:
a) a glass substrate;
b) a color suppression interlayer deposited on said glass substrate;
c) a base coating of a substantially undoped metal oxide applied over said color suppression interlayer and having a thickness from 200 Å to 3,000 Å; and
d) an electrically conductive coating of a doped metal oxide, applied directly to said substantially undoped metal oxide layer, wherein, the source metal from which the oxides of the substantially undoped and doped coatings are derived is the same;

said coated glass article being heat strengthened to have a surface compressive stress greater than 3,500 pounds per square inch, and having a sheet resistance of at least 232 ohms/square.

* * * * *